Nov. 4, 1952   F. STOGERMAYR   2,616,208
FISHHOOK HOLDER
Filed Sept. 20, 1950
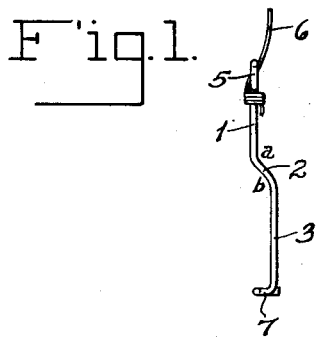
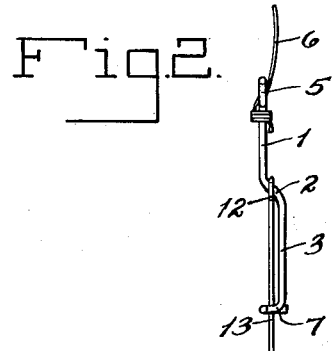
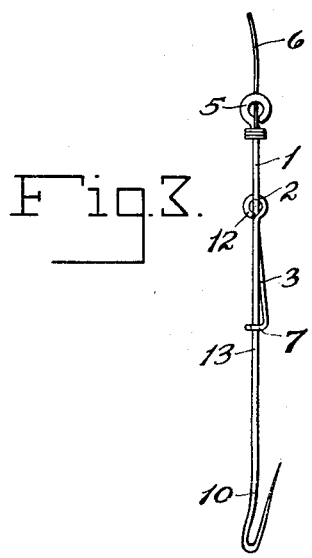
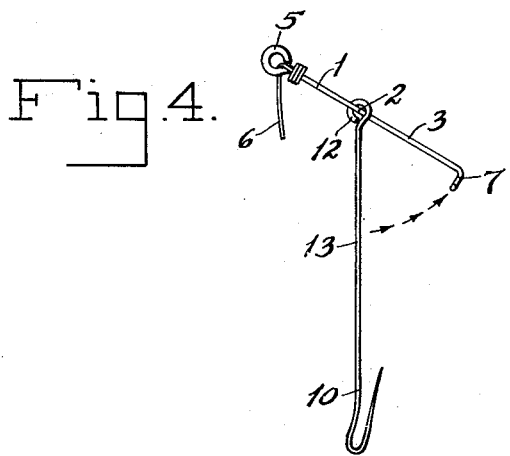
INVENTOR.
FRED STOGERMAYR
BY
K. E. Kavanagh
ATTORNEY Patented Nov. 4, 1952

2,616,208

UNITED STATES PATENT OFFICE 2,616,208

FISHHOOK HOLDER

Fred Stogermayr, Hoboken, N. J., assignor of one-third to F. F. Calabrese and one-third to A. L. De Benedetto, both of Jersey City, N. J.

Application September 20, 1950, Serial No. 185,739

3 Claims. (Cl. 43—44.83)

This invention relates to a novel holder for fishing hooks which allows rapid interchange of hooks without troublesome winding and splicing of a fishing line.

There have been attempts in the past to fashion holders for fishing hooks which will facilitate changing of hooks, the removal of a fish from a hook and the rebaiting of a hook. However, these prior attempts to produce a coupling have been cumbersome and crude devices which did not satisfy this long felt need since their complexity defeated their purpose. However, the present invention provides a neat simple device which permits rapid interchange of fishing hooks and which will find ready acceptance because of its simplicity and efficiency in operation.

The fishing hook holder of this invention comprises a metal bar of restricted diameter which is divided into an upper and lower section by a diagonal step-like middle segment of restricted length. The upper section is adapted for attachment of a leader which may be nylon, gut, or wire; the upper section can terminate in an eyelet to which the leader can be attached but it is also feasible for the upper section to be a straight bar to which a leader can be attached by winding and splicing. The lower section terminates in a U-shaped member which is perpendicular to the plane of said lower section. When a conventional fishing hook is positioned so that its eyelet encircles the middle segment and the shank is cradled by the U-shaped member, the hook is held securely in place by the spring tension exerted by the lower section between the two points of contact of the fishing hook with the holder.

The holder is readily attached to a leader and thence to a line. A leader can be tied to an eyelet at the end of the upper section or it can be wound and spliced around the upper section of the holder. A fishing hook is readily inserted into position in the holder attachment of this invention by slipping the end of the U-shaped member within the eyelet of a conventional fishing hook and sliding the eyelet along the holder until the eyelet is positioned in encircling relationship with the middle segment of said attachment. When the eyelet is in position around the middle segment, the shank of the fishing hook is cradled within the U-shaped member at the end of the lower section. When the hook is in this position, it is securely held by the spring tension exerted on the lower section of the holder between the middle segment and the U-shaped member.

The securely fastened hook is readily detached from the holder of this invention by exerting pressure on the lower section and removing the shank of the fishing hook from the U-shaped member wherein it is cradled; thereafter the fish hook is simply removed from the holder by withdrawing the holder through the eyelet of the hook.

It is apparent that insertion and removal of fishing hooks from the holder of this invention is a simple operation which can be effected in a minimum of time. The outstanding feature of this invention is its simplicity of operation coupled with its effectiveness in securely holding a fishing hook in rigid relationship.

The holder of this invention may be made in a plurality of sizes. Each size is designed to hold about ten to fifteen hooks of varying size. There are small holders which are suitable for use with smaller hooks such as are used in fly fishing for trout. At the other extremity there are large holders adapted for use in deep sea ocean fishing for large game fish such as sword fish and tuna. Since each holder is adapted for use with approximately ten to fifteen size hooks, five or six different holders cover the whole field of various types of fishing.

The middle segment of the holder of this invention is of restricted length. The middle segment is longer in length than the diameter of the largest hook which will fit into the holder. Advantageously, the middle segment is one and one-fourth to three times the diameter of the largest hook which will fit into the holder. The restricted length of the middle segment prevents undue movement of the eyelet when it engages the middle segment in encircling relationship.

Approximately 135° internal angles are formed between the upper section and the middle segment and the lower section and the middle segment.

The U-shaped member is ordinarily of such magnitude that the bottom of the U is on approximately the same horizontal plane as the upper section of said holder attachment. In this manner the pressure of the fish hook eyelet against the upper section and of the fish hook shank against the bottom of the U-shaped member provides the spring tension required to securely hold the fish hook in place.

The diameter of the holder is slightly less than the internal diameter of the eyelet of the smallest hook which it is designed to hold. This requirement is obvious since it is necessary for the hook attachment to be inserted within the eyelet in order to position the eyelet in encircling relationship with the middle segment of the holder attachment. Advantageously, the holder is of uniform diameter but it is feasible for the upper section to be of larger diameter since this portion of the holder does not pass through the eyelet of the fishing hook.

In the accompanying figures there is illustrated the holder of this invention. The effectiveness of the holder in securely holding a fishing hook and its simplicity of operation is readily apparent from the accompanying figures.

Figure 1 is a plane view of the holder.

Figure 2 is a horizontal view of the holder containing a fish hook securely positioned therein.

Figure 3 is a perspective of the holder in combination with a securely fastened fish hook.

Figure 4 illustrates a holder and a conventional fish hook just prior to the fastening of the hook in position by engaging the shank of the fish hook with the U-shaped member.

In Figure 1 the upper section is designated by the numeral 1, the diagonal step-like middle segment by numeral 2 and the lower section by the numeral 3. The eyelet in the terminus of the upper section 1 is designated by the numeral 5 and in the drawing a leader 6 has been fastened to the holder through use of the eyelet 5. The U-shaped member 7 is in perpendicular relationship with the lower section 3. It will be observed that the bottom of the U-shaped member 7 is on approximately the same plane as the upper section 1. The angles a and b are approximately 135°.

In Figure 2 a fish hook 10 is securely held in the holder. It will be observed that the eyelet 12 of the hook is in encircling relationship with the middle segment 2 of the holder and that the shank 13 of the fish hook 10 is cradled in the U-shaped member 7. It is apparent in Figure 2 that the hook is securely fastened and positioned by the spring tension exerted on the holder between the points where the eyelet 12 of the fish hook 10 engages the middle segment 2 and the shank 13 of the fish hook 10 engages the U-shaped member 7.

Figure 3 is a perspective of the holder with a fish hook securely positioned therein. From this figure also it is apparent that the fish hook is securely fastened to the holder by spring tension.

Figure 4 illustrates the relationship of the holder and fish hook just prior to the positioning of the shank 13 of the fish hook 10 in the U-shaped member 7. It is observed that the eyelet 12 of the fish hook 10 is in encircling relationship of the middle segment 2 of the holder.

All that is required to securely fasten the hook in position is to swing the hook in the direction indicated by the arrows and cradle it within the U-shaped member 7.

It is apparent from the foregoing description that the holder of this invention is adapted to all sizes of fish hooks by merely increasing the length of the lower section 3 and of the middle segment 2. A holder can be made which will fit a hook of any size.

Obviously many modifications and variations of the invention, as hereinbefore set forth, may be made without departing from the spirit and scope thereof, and therefore only such limitations should be imposed as are indicated in the appended claims.

I claim:

1. A fish hook having a straight shank terminating in one end in an eye, an attachment comprising two straight sections connected by an inclined segment, said attachment having an eye at the end of one section and a U-shaped formation at the end of the other section, said segment passing through said eye of said hook shank and being adapted to partially surround said shank while the segment is within the eye of said hook shank, the eye of said attachment being adapted for connection to a leader, said attachment being readily separable from said hook eye by a sliding and turning movement of said attachment or hook.

2. A device of the type described in claim 1 in which said inclined segment is one and one-fourth to three times longer than the diameter of the shank of said fish hook.

3. A device of the type described in claim 1 wherein the diameter of said attachment is less than the internal diameter of said eye of said fish hook.

FRED STOGERMAYR.

REFERENCES CITED

The following references are of record in the file of this patent:

UNITED STATES PATENTS

| Number | Name | Date |
| --- | --- | --- |
| 863,078 | Merz | Aug. 13, 1907 |
| 1,325,530 | Ore | Dec. 23, 1919 |
| 1,739,590 | Hill | Dec. 17, 1929 |
| 2,148,074 | Kaspick | Feb. 21, 1939 |
| 2,532,045 | Walsh | Nov. 28, 1950 |